United States Patent [19]

Drissel et al.

[11] 3,957,463
[45] May 18, 1976

[54] OXYGEN ENRICHMENT PROCESS

[75] Inventors: Gerald M. Drissel; Shivaji Sircar, both of Allentown, Pa.

[73] Assignee: Air Products and Chemicals, Inc., Allentown, Pa.

[22] Filed: Dec. 12, 1973

[21] Appl. No.: 423,995

[52] U.S. Cl. .................................. 55/25; 55/58; 55/68
[51] Int. Cl.² ................................. B01D 53/02
[58] Field of Search ............ 55/25, 31, 32, 58, 62, 55/75, 389, 179, 68

[56] References Cited
UNITED STATES PATENTS

| | | | |
|---|---|---|---|
| 3,533,221 | 10/1970 | Tamura................................... | 55/62 |
| 3,719,025 | 3/1973 | Heinze et al............................ | 55/31 |

Primary Examiner—John Adee
Attorney, Agent, or Firm—Harold A. Hormann; Barry Moyerman

[57] ABSTRACT

Ambient air, during an on-stream period, is passed through a first adsorbent bed removing moisture and carbon dioxide and then through a second bed of adsorbent selective for retention of nitrogen, the oxygen-rich effluent being collected in an expandable receiver. Desorption of both beds is effected by reducing the pressure at the inlet end of the first bed causing desorbed nitrogen from the second bed to pass through the first bed, desorbing moisture and $CO_2$ therefrom. Further removal of moisture and $CO_2$ from the first bed is then effected by lowering the pressure of that bed further, while the second bed is restored to its on-stream pressure by admission of enriched oxygen thereto from the expandable receiver.

7 Claims, 1 Drawing Figure

3,957,463

OXYGEN ENRICHMENT PROCESS

BACKGROUND OF THE INVENTION

Numerous and diverse systems are described in the patent literature for separation of gases by preferential adsorption. Typical among these, particularly designed for or asserted to be useful in the recovery of an enriched oxygen product stream from air, are the pressure swing adsorption systems described in U.S. pat. Nos. 2,944,627; 3,564,816; 3,636,679; and in published German patent application OLS No. 2,153,807. The systems described in these patents utilize zeolite molecular sieves as adsorbents and involve intricate cycle time operational sequences necessitating complex valve arrangements for their operation.

In U.S. pat. No. 3,533,221, a system is described for recovery of an enriched oxygen stream from air wherein the air charged to the system is initially passed through an adsorption column to remove carbon dioxide and moisture therefrom and then into a nitrogen adsorption column, recovering therefrom a product stream enriched in oxygen. When the effluent from the nitrogen adsorber contains nitrogen in excess of the desired maximum level, the air supply is discontinued and vacuum applied at the air inlet end to desorb the nitrogen column, the desorbed gas being passed through the water-$CO_2$ adsorption column enroute to discharge. The water-$CO_2$ adsorption column in the described system needs to be periodically regenerated. For this purpose two such water-$CO_2$ pretreatment columns are provided for each nitrogen adsorption column, being alternately connected to the nitrogen column so that one of these is in adsorptive opertion while the other is being regenerated. Regeneration of the water-$CO_2$ adsorption column is effected by heating the adsorbent therein to drive off water and carbon dioxide.

While the gas separation and purification system of the present invention utilizes a pretreatment column for removal of water and carbon dioxide from the feed gas prior to its separation by selective adsorption of one or more components in a subsequent adsorption column, the operation is carried out under conditions such that isolation of the pretreatment column from the system for its separate regeneration need not be practiced.

BRIEF DESCRIPTION OF THE INVENTION

In accordance with the present invention, a simplified and efficient vacuum swing gas separation and purification system is provided wherein a pretreatment adsorption column is utilized for removal of water and carbon dioxide from the charge gas prior to further adsorptive fractionation of such gas. The system preferentially employs two or more fractionation columns in parallel alternately operated in timed sequence through successive steps of adsorption and desorption. Each of the fractionation columns is connected in series with a pretreatment adsorber column. During desorption of the fractionating column under reduced pressure, the desorbed gas from such column is passed serially through the associated pretreatment column purging such column of a portion of its contained moisture and carbon dioxide while under the applied suction. Further removal of moisture and carbon dioxide from the pretreatment column is then effected by shutting off the flow communication between the pretreatment column and its associated fractionation column, while continuing vacuum application to the pretreatment column alone, thus regenerating the water-$CO_2$ adsorption column during each cycle. During the further application of vacuum to the pretreatment column, the fractionation column is repressured with product gas before returning on stream for repetition of the adsorption-desorption sequence.

DETAILED DESCRIPTION

Figure 1:
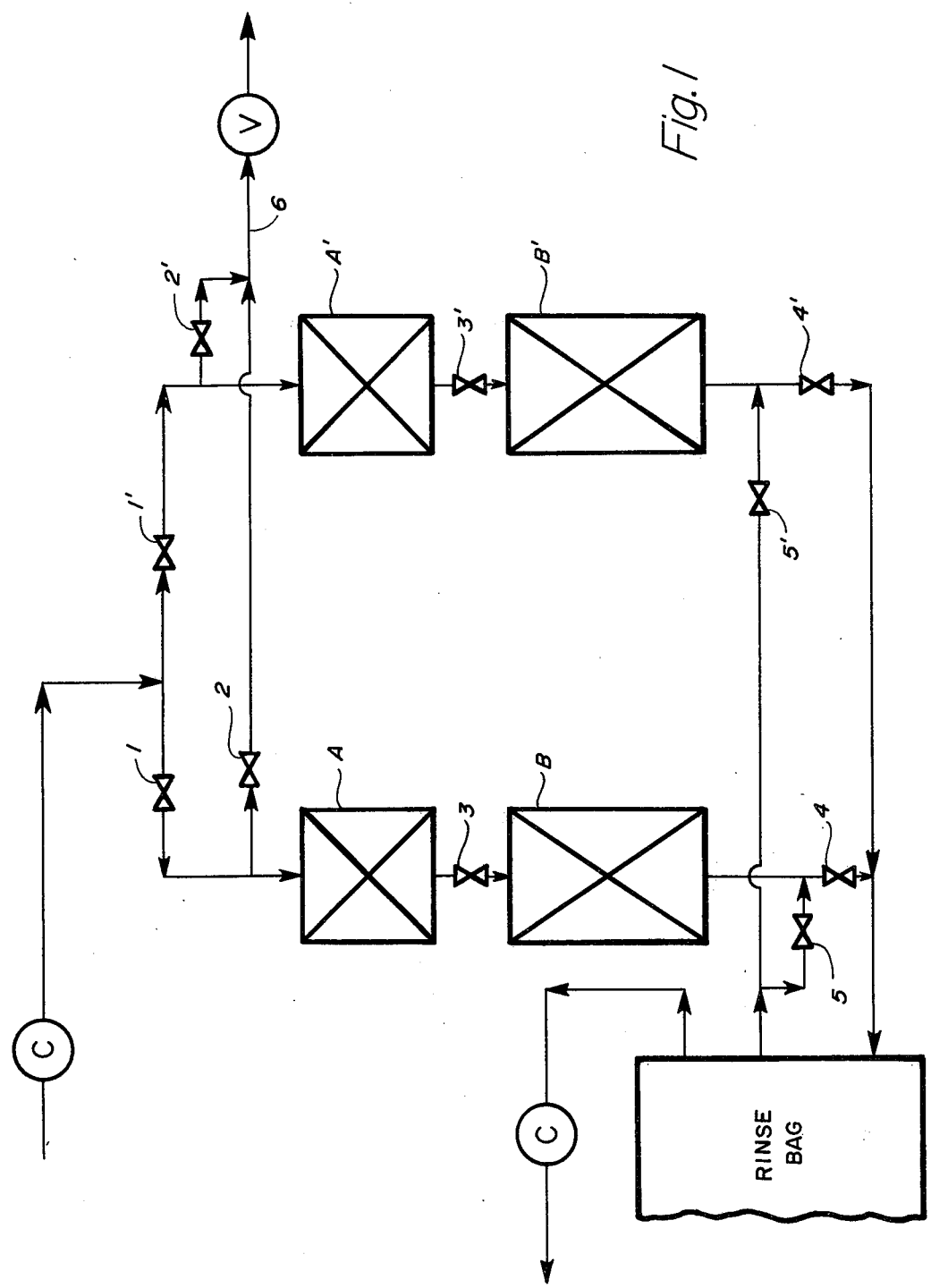

The invention will be understood and its several advantages appreciated from the detailed description which follows, read in connection with the schematic flow diagram shown in the accompanying drawings.

While not limited thereto, the system of the present invention is particularly advantageous in the production of an enriched and purified oxygen product stream from atmospheric air or from other oxygen-nitrogen gas mixtures containing water and/or carbon dioxide as an impurity. The particular embodiment hereinafter described in detail is accordingly directed to purification and separation of atmospheric air as the charge gas which ordinarily contains minor amounts of water and carbon dioxide.

The incoming air is compressed slightly above atmospheric pressure to accomodate the pressure drop through the adsorption columns and transfer lines. In general, a pressure of 0.5 to 5 pounds per square inch gauge will be sufficient for this purpose. With valve 1 being open and valves 1' and 2 closed, the compressed air enters the pretreatment column A which contains adsorbent suitable for selective removal of moisture and carbon dioxide. Column A has previously been purged, as will hereinafter appear, and regenerated by evacuation to lowest pressure, preferably below 50 mm. Hg. After passing through column A, the thus pretreated air passes through open valve 3 into fractionating column B containing an adsorbent preferentially adsorbing and retaining nitrogen while permitting oxygen to pass through. Adsorber column B prior to receiving the air charge, has been brought to about atmospheric pressure by introduction of an oxygen gas stream of high purity obtained from a source hereinafter described. The effluent from column B including a portion of the oxygen which had been adsorbed in the bed by the repressuring step hereinafter described, is eluted and passes out of the bed with the unadsorbed oxygen. This effluent is discharged through open valve 4 into a so-called "rinse bag" for temporary storage. The rinse bag is a vessel of expandable volume which is maintained at about atmospheric pressure. This vessel provides for product surge capacity during operation of the system, from which high purity oxygen product can be withdrawn for desired use or further storage. The rinse bag also serves as the supply source for high purity oxygen gas used in repressuring the fractionation vessels at the conclusion of the desorption step to be described.

Flow of air through valve 1 and continuous withdrawal of product gas through valve 4 and into the rinse bag is continued until there is a breakthrough of nitrogen in the effluent from adsorber B or just short of that point which may be designated as the point of incipient nitrogen breakthrough. The breakthrough point may be defined as that at which the effluent from an adsorber B or B' contains substantially the amount of nitrogen as that contained in the charge gas or at a predetermined level short of that amount depending upon desired product quality.

When the desired termination of the adsorption step is reached, further supply of air to columns A and B is discontinued. This is accomplished by closing valves 1 and 4 and switching the flow of the air charge to companion columns A' and B', with the opening of valve 3' and subsequent opening of valves 1' and 4' as hereinafter described. Thus, the operation heretofore conducted in columns A and B is continued in corresponding columns A' and B' with the flow of oxygen-enriched product gas into the rinse bag.

Columns A and B are now ready for desorption and regeneration. After closing valve 1, valve 2 is now opened, permitting flow of residual unadsorbed and adsorbed gases into line 6. Suction is applied through line 6 to withdraw any remaining unadsorbed gas and to desorb the respective adsorbents contained in columns A and B. With valve 3 remaining open, desorption of columns A and B is thus continued for a period during which these vessels are brought to an intermediate pressure below atmospheric. For example, these vessels may be brought to a pressure of below 60 mm. Hg or preferably to below about 50 mm. Hg. Valve 3 is then closed while the application of suction through line 6 is continued thus further evacuating column A and thereby regenerating that column by further removal of adsorbed moisture and carbon dioxide from that column. Such further evacuation of column A is continued for a period until the column is brought to the lowest pressure designed for the cycle of operations; for example, evacuation of column A is continued to an attained pressure of at least 10 mm. Hg below the intermediate pressure and preferably to an ultimate pressure of about 30 to 10 mm Hg. The ultimate lowest desorption pressure to be employed is dictated largely by the quality of the ambient air and the properties of the adsorbent being used. During this period of further evacuation of column A, with valve 3 closed, column B is repressured with high purity oxygen gas from the rinse bag, bringing that column back to about atmospheric pressure. This is accomplished by opening valve 5 permitting flow of collected oxygen product gas from the rinse bag into column B until these vessels are at equal pressure (atmospheric), the rinse bag contracting to lower volume while remaining at atmospheric pressure.

As a final step in the sequence, valve 2 is now closed, discontinuing evacuation of column A, and, in accordance with the presently described embodiment, valve 3 is reopened, permitting flow of the rinse gas from the rinse bag through column B into column A until column A is brought from the lowest attained pressure to the equal pressure of column B (about atmospheric). At this point, the cycle of operation already described may be resumed by suitable valve changes, placing columns A and B on stream to receive the air charge, while columns A' and B' which were on adsorption during the desorption of columns A and B, undergo the desorption sequence and repressuring as already described for companion columns A and B.

Table I below illustrates a time program for the various steps in the sequence of operations based on an embodiment employing a suggested 4 minute cycle, and indicating the valve positions during the sequence. It will be understood, however, that the 4 minute cycle described is merely illustrative and other time cycles may be employed in practice of the invention.

TABLE I

| Time (Sec.) | Valve Positions | | | | | | | | | | Vessel Pressures (mm Hg) | | | | Process | | | |
|---|---|---|---|---|---|---|---|---|---|---|---|---|---|---|---|---|---|---|
| | 1 | 1' | 2 | 2' | 3 | 3' | 4 | 4' | 5 | 5' | A | A' | B | B' | A | A' | B | B' |
| 0 – 5 | C | C | C | O | O | O | C | C | O | C | 10–760 | 760 | 760 | 760 | R | D | S | D |
| 5 – 75 | O | C | C | O | O | O | O | C | C | C | 760 | 760–50 | 760 | 760–50 | A | D | A | D |
| 75 – 120 | O | C | C | O | O | C | O | C | C | O | 760 | 50–10 | 760 | 50–760 | A | D | A | R |
| 120 – 125 | C | C | O | O | O | O | C | C | O | C | 760 | 10–760 | 760 | 760 | D | R | D | S |
| 125 – 195 | C | O | O | C | O | O | C | O | C | C | 760–50 | 760 | 760–50 | 760 | D | A | D | A |
| 195 – 240 | C | O | O | C | C | O | C | O | O | C | 50–10 | 760 | 50–760 | 760 | D | A | R | A |
| 0 – 5 | C | C | C | O | O | O | C | C | O | C | 10–760 | 760 | 760 | 760 | R | D | S | D |

Notes:
A = on adsorption
D = on desorption
R = repressuring with product gas from rinse bag
S = equalization by flow of rinse gas from B to A or from B' to A'

It will be apparent from the foregoing that during the on-stream adsorption period gas flow into and through columns A and B is by way of open valves 1, 3 and 4; during which period, valves 1' and 4' are closed. While columns A and B are on adsorption companion columns A' and B' are being countercurrently desorbed of previously adsorbed gas. The desorption of columns A' and B' is begun during flow of rinse gas from B to A and continued during the next period that columns A and B are receiving charge gas. The desorption of A' and B' is accomplished by opening valve 2' leading into suction line 6, while valve 3' remains open and valves 4' and 5' closed. Suction on column A' is thereafter continued with valve 3' being closed to further evacuate column A' to lowest pressure in the operation cycle, while column B' is repressured with high purity oxygen admitted thereto by opening valve 5' in the line leading from the rinse bag. In the presently described embodiment countercurrent flow of rinse gas from B' to A' to equalize the pressure therebetween, is effected by reopening valve 3' while flow of gas through open valve 5' is continued.

In columns A and A' any solid adsorbent suitable for retaining moisture and $CO_2$ may be employed such as silica gel, alumina, activated carbon or a zeolitic molecular sieve of natural or synthetic origin, such as mordenite or molecular sieve 5A. In columns B and B' the adsorbent may be any molecular sieve material having preferential affinity for adsorption of nitrogen from its admixture with oxygen under the process conditions employed. For this purpose known commercial adsorbents may be utilized such as 5A molecular sieve (calcium zeolite A) or a synthetic mordenite having pore openings of about 5 to 10 angstrom size, preferably Norton Zeolon 900-Na, which is purported to have pore openings in about the 7 angstrom range. The adsorbents recommended for use in columns B and B' may also be used, if desired, in columns A and A'.

In the particular embodiment above described, the repressuring of the water-carbon dioxide adsorption beds A and A' is effected by flow of oxygen rich gas thereinto from their associated fractionating columns B and B' respectively through opened valves 3 and 3'. In an alternative embodiment the watercarbon dioxide adsorption beds A and A' may be repressured by gases other than the previously indicated oxygen rich gas. Typically, there may be utilized for such repressuring: air, nitrogen, oxygen or other suitable gas or gas mixture from any source. During such repressuring, of course, valves 3 and 3' in turn, will be closed. If the gas used to repressure beds A and A' contains water or $CO_2$, the repressuring gas will be introduced to flow in a direction cocurrent to that of the gas stream charged during the adsorption step. If the repressuring gas is substantially free of water and $CO_2$, repressuring of beds A and A' may be carried out in either direction; that is cocurrent or countercurrent to the flow of gas charged during the adsorption step.

Table 2 below illustrates a time program for the various steps in the sequence of operations based on a suggested 4 minute cycle using ambient air for repressuring beds A and A'; and indicating the respective valve positions during the sequence.

The described embodiments are predicated on a practical system employing two parallel trains of adsorbers operated in a programmed time schedule of one-half cycle out of phase. This insures a continuous flow of product gas and maximizes utilization of the gas-handling equipment. It will be appreciated that a single train comprising a water-$CO_2$ adsorber and a nitrogen selective adsorber in series could be utilized without departing from the essential features of the invention; however, this would be at the sacrifice of desirable continuous adsorber product flow and utilization of gas-handling equipment. In some instances it may be found desirable to employ a time schedule wherein the period employed for the on-stream blow (adsorption) and repressuring and that needed for desorption are not equal. In such instance three or more parallel trains of adsorbers may be employed in appropriate timed sequence. The valve changes during the cycle of operations in any such modification, are programmed in well known manner and are automatically carried out under control of a cycle timer device.

While the several described embodiments are concerned with the recovery of an oxygen-enriched product stream from atmospheric air, it will be understood that other gas mixtures comprising oxygen and nitrogen could be similarly treated. For example, oxygen-containing waste gas recovered from treatment of sewage

TABLE II

| Time (sec.) | Valve Positions | | | | | | | | | Vessel Pressures (mm.Hg) | | | | Process | | | |
|---|---|---|---|---|---|---|---|---|---|---|---|---|---|---|---|---|---|
| | 1 | 1' | 2 | 2' | 3 | 3' | 4 | 4' | 5 | 5' | A | A' | B | B' | A | A' | B | B' |
| 0–5 | O | C | C | O | C | O | C | O | C | C | 10–760 | 760⁻ | 760 | 760 | P | D | S | D |
| 5–75 | O | C | C | O | O | O | O | C | C | C | 760 | 760⁻ – 50 | 760 | 760⁻ – 50 | A | D | A | D |
| 75–120 | O | C | C | O | O | C | O | C | C | O | 760 | 50–10 | 760 | 50–760 | A | D | A | R |
| 120–125 | C | O | O | C | O | C | C | C | C | O | 760⁻ | 10–760 | 760⁻ | 760 | D | P | D | S |
| 125–195 | C | O | O | C | O | O | C | O | C | C | 760⁻ – 50 | 760 | 760⁻ – 50 | 760 | D | A | D | A |
| 195–240 | C | O | O | C | C | O | C | O | O | C | 50–10 | 760 | 50–760 | 760 | D | A | R | A |
| 0–5 | O | C | C | O | C | O | C | O | C | C | 10–760 | 760⁻ | 760 | 760⁻ | P | D | S | D |

Notes:
A = on adsorption
D = on desorption
R = repressuring at bed B or B' with product gas from rinse bag
S = static condition for bed B or B' during repressuring of A or A'
P = repressuring of bed A or A' to adsorption pressure In the illustrative embodiment above described the intermediate pressure achieved during vacuum desorption of the nitrogen adsorbers and of the water-$CO_2$ pretreating adsorbers, is designated as being below 60 mm. Hg or at about 50 mm. Hg. The intermediate pressure level (or the final pressure with respect to the nitrogen adsorbers) will be determined by the desired oxygen purity required. With lower pressure utilized during desorption, the purity of the obtained oxygen product is enhanced. Such enhancement of purity, however, results in reduced yield of product gas.

The final pressure or lowest pressure attained by the further evacuation of the water-$CO_2$ adsorbers alone, is dictated by the equilibrium vapor pressure of water over the adsorbent selected for use in these adsorbers. In all instances, however, the final pressure attained on desorption of the water-$CO_2$ adsorber beds will be substantially lower than the final vacuum pressure in the nitrogen adsorber beds.

Also, the cycle time periods indicated in the described embodiment are illustrative and may be varied as required in actual operation depending upon the product purity required and the particular adsorbent materials employed.

or sludge with oxygen-rich gases, may be purified and reconcentrated in oxygen by the described system of the invention.

EXAMPLE

Experimental test runs were conducted in a single column using 5A molecular sieve (Ca aluminosilicate) for adsorption of water and $CO_2$ in advance of a bed of Norton Zeolon 900 Na (mordenite molecular sieve), in the form of 1/6 inch pellets. The packed column was employed in treatment of ambient air passed serially downward through the beds of 5A sieve and Zeolon sieve respectively, at the rate of 6 to 6.5 liters/min., for a period of 90 seconds. During this period, the effluent, which consisted of high purity oxygen product, was collected in an expandable receiver (rinse bag) maintained under atmospheric pressure, part of which effluent was subsequently employed for repressuring the beds. At the end of the air blow (adsorption) period the column was a few seconds short of breakthrough. Charging of air was discontinued at this point and vacuum applied at the top of the column, removing first unadsorbed voids gas then desorbing part of the adsorbed nitrogen, water and $CO_2$. In several runs the final desorption pressure was varied as shown in Table III below. Evacuation was continued in each instance for 120 seconds. The vacuum was then broken by introducing high purity oxygen into the column from the rinse bag at the rate of 8 to 9 liters per minute, for 30 seconds. At the end of this period of repressuring with oxygen the column was again at about atmospheric pressure, and the cycle again repeated with introduction of atmospheric air.

It was found that the quality and quantity of the product gas depended upon the final desorption pressure in the nitrogen adsorber. Evacuation of the nitrogen-selective adsorbent bed to 30 torr achieves the production of a product stream having 90% oxygen (by volume) from atmospheric air.

The effect of final desorption pressure in the nitrogen adsorber on oxygen purity and on product volume is shown in Table III below:

TABLE III

| Final Desorption Pressure (Torr) in the Nitrogen Adsorber | % $O_2$ In Product Gas | Relative Vol. product Gas Vol./Vol. Adsorbent |
|---|---|---|
| 148 | 67 | 1.9 |
| 72 | 80 | 1.68 |
| 55 | 84 | 1.61 |
| 24 | 91 | 1.5 |
| 10 | 95* | 1.44* |

*extrapolated

The experimental value shown above when plotted as Cartesian coordinates, with pressure as abscissa, show substantially a simple straight line relation over the range covered.

What is claimed is:

1. In a method for regenerating adsorbents reduced in sorbent capacity during use in an oxygen enrichment vacuum swing gas separation and purification system utilizing a first bed of absorbent effective in adsorption of carbon dioxide and water and a second bed of adsorbent selective in retention of nitrogen as opposed to oxygen, said system operating on a cycle including a sorbtive gas separation and purification period and a regeneration period during which charge gas flow is discontinued, the improvement in regeneration which comprises.

a. applying a vacuum to the inlet end of said first bed while maintaining flow communication between said first bed and said second bed,
b. continuing application of said vacuum to said beds and attaining a reduced intermediate pressure of less than 60 mm. Hg, thereby desorbing gases from said beds including substantially all of the nitrogen from said second bed,
c. discontinuing flow communication between said second and said first beds while continuing vacuum application to said first bed to a lower terminal pressure at least 10mm. Hg below said intermediate pressure thereby desorbing any residual moisture and carbon dioxide from said first bed,
d. repressuring said second bed with product gas to about sorption cycle pressure during said continuing vacuum application to said first bed,
e. discontinuing vacuum application to said first bed and repressuring said first bed to about sorptive cycle pressure,
f. re-establishing flow communication between said first bed and said second bed and resuming the charge gas flow for sorbtive gas separation and purification.

2. The method as defined in claim 1 wherein the defined cycle of operation is carried out in parallel in at least two series connected trains of first and second beds, so that during a period that at least one such train of beds is on stream another parallel train is being desorbed.

3. The method as defined in claim 1 wherein said charge gas is ambient air.

4. The method as defined in claim 1 wherein said terminal bed pressure is in the range of from about 30 to about 10 mm. Hg.

5. The method as defined in claim 1 wherein said first bed is restored to about atmospheric pressure by flow of gas thereinto from said second bed.

6. The method as defined in claim 1 wherein said first bed is restored to about atmospheric pressure by flow of gas thereinto in a direction concurrent to that employed during on-stream adsorption.

7. The method as defined in claim 1 wherein said first bed is restored to about atmospheric pressure by flow of ambient air thereinto.

* * * * *